H. CENTERVALL.
VARIABLE STROKE PUMP.
APPLICATION FILED OCT. 3, 1916.
1,321,086.
Patented Nov. 11, 1919.
2 SHEETS—SHEET 1.
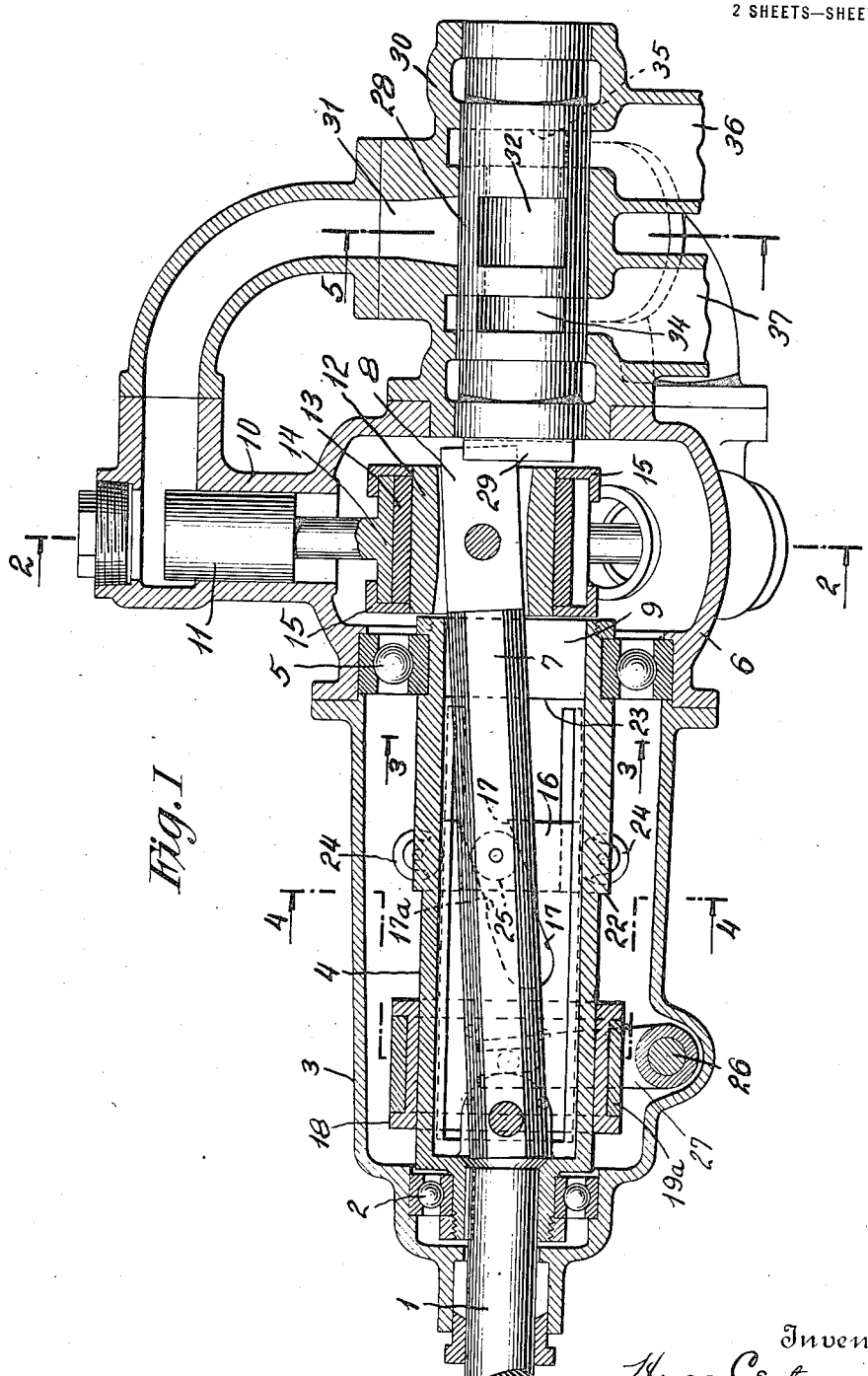
Fig. 1
Inventor
Hugo Centervall

H. CENTERVALL.
VARIABLE STROKE PUMP.
APPLICATION FILED OCT. 3, 1916.
1,321,086.
Patented Nov. 11, 1919.
2 SHEETS—SHEET 2.
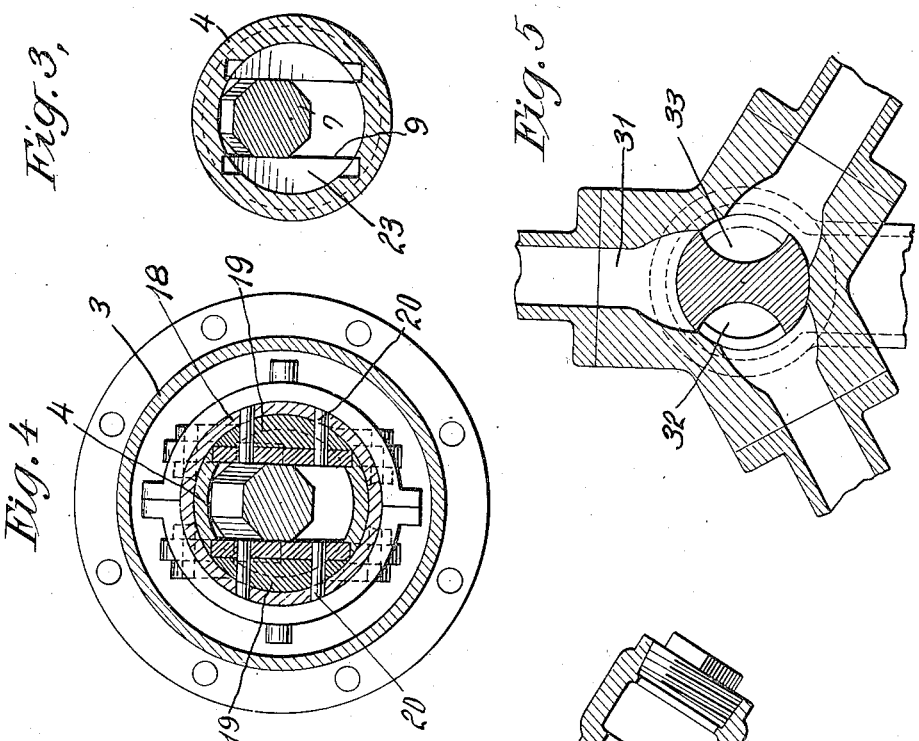
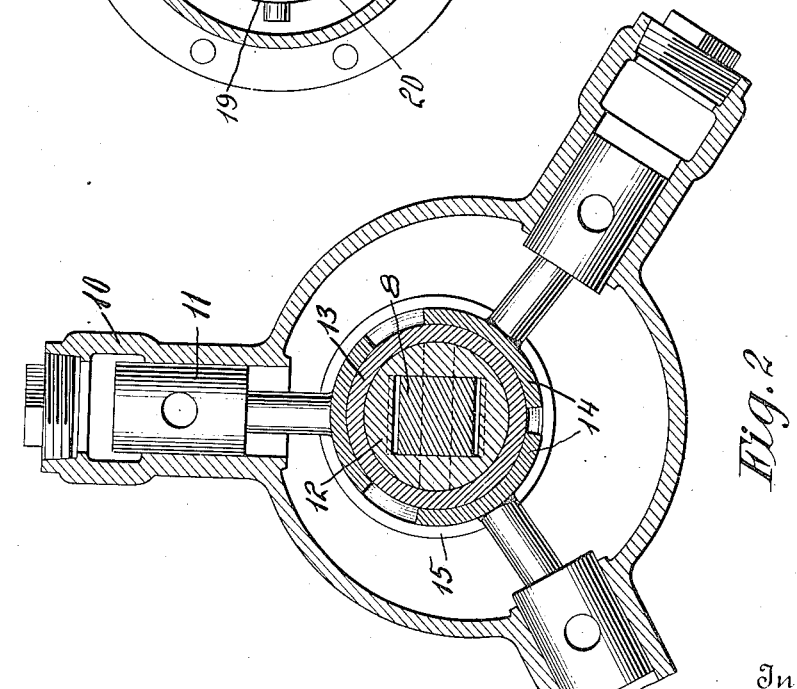
Inventor
Hugo Centervall
By his Attorney
W. B. Morton

UNITED STATES PATENT OFFICE.

HUGO CENTERVALL, OF BROOKLYN, NEW YORK.

VARIABLE-STROKE PUMP.

1,321,086.          Specification of Letters Patent.     Patented Nov. 11, 1919.

Application filed October 3, 1916. Serial No. 123,487.

*To all whom it may concern:*

Be it known that I, HUGO CENTERVALL, a citizen of Sweden, and a resident of Brooklyn, county of Kings, city and State of New York, have invented new and useful Improvements in Variable-Stroke Pumps, of which the following is a specification.

This invention relates to hydraulic variable speed gears, and particularly to the class of gears of which an example is shown in a prior patent of Charles M. Manly, 801,097, granted October 3, 1905.

Such gears comprise essentially a pump of variable capacity connected to form a closed fluid circuit with a hydraulic motor which may be of either fixed or variable capacity as desired, whereby the fluid circulated by the pump drives the motor at a relative speed determined by the ratio of the capacity of the pump per revolution to that of the motor. The improvements of my present application are concerned only with the pump and I will not therefore illustrate or describe the motor construction, as any approved form of motor may be used.

The object of the present invention is to provide a gear of this type in which the adjusting mechanism is simplified to do away with all parts requiring the accurate construction and adjustment of the double eccentric of the patent aforementioned, and to provide a stroke adjusting mechanism composed of few simple parts which may be of rugged construction able to stand the heavy strain and wear of severe usage, and not liable to get out of order.

A further object of the invention is to provide a gear of this type having an adjusting mechanism in which the driven load is balanced relatively to the direction of adjustment of the variable stroke crank so that the movement of the crank pin in the adjustment of the stroke is not resisted by any portion of the load being driven, and may consequently be easily adjusted with no more effort than necessary to overcome the friction of the parts.

A further object of the invention is to provide a gear of this character in which the crank shaft constitutes a directly connected continuation of the driving shaft and in which the valve operating mechanism is directly connected for rotation in unison with the crank shaft, whereby synchronous operation of the parts is secured in all positions of adjustment without intricate connections liable to lost motion and wear.

In the drawings I have illustrated a preferred embodiment of my improved gear, wherein—

Figure 1 is a vertical section through the axis of rotation and through one of the driving cylinders;

Fig. 2 is a transverse section on line 2—2 of Fig. 1; and

Figs. 3, 4 and 5 are transverse sectional views on the correspondingly numbered lines of Fig. 1.

Referring to the drawings, 1 indicates the driving shaft which, in the operation of the device is intended to be continuously driven at uniform speed. The driving shaft is mounted for rotation on a suitable ball bearing 2 in the end of the casing 3 which incloses the stroke-adjusting mechanism. Keyed to the end of the driving shaft and forming a fixedly connected continuation of it is a sleeve or enlarged hollow shaft 4 whose opposite end terminates near the end of the crank case 6 of the pump proper, just beyond the end of the control casing 3 where it is joined to the crank case.

Within the hollow shaft 4 there is mounted a polygonal shaft 7 here shown as octagonal for the portion of its length within the sleeve 4 and provided with a substantially square projecting end which forms in effect the crank pin of the pump. The shaft 7 is pivoted at its attached end in line with the driving shaft 1 for movement at its free end in a radial plane between suitable bearing faces 9 formed within the bore of the sleeve 4 to embrace the end of shaft 7.

Projecting radially from the crank case 6 are the pump cylinders 10 here shown as three in number and provided with solid pistons 11 to be driven from the common crank pin formed by the projecting end of the shaft 7. The pistons are connected to the crank pin 8 through the medium of a sleeve 12 pivoted to the squared end 8 of the shaft, as shown more particularly in Fig. 2, the two opposite faces of the squared bore being tapered slightly from the middle to the ends of the sleeve in order to permit the peripheral surface of the sleeve to remain in parallelism with the axis of rotation during the tilting movement of the shaft 7. Surrounding the periphery of the sleeve 12 is a bearing ring 13 against which the shoes 14 on the end of the connecting rods of the pump piston are held in working engagement by means of the usual rings 15.

The tilting movement of the shaft 7 to effect the change in pump strokes is accomplished by means of a cam mechanism comprising plates 16 supported in the tubular shaft 4 on each side of the shaft 7 for movement axially of the tubular shaft. The plates 16 are each provided with an inclined slot 17 and projecting into each slot is a roller 25 mounted on a stub shaft projecting from the adjacent side face of the pivoted shaft.

The plates 16 are supported and operated by a ring or collar 18 mounted on the tubular shaft 4 within the casing 3. The sleeve 18 is mounted for longitudinal movement throughout about half the length of the shaft 4 and the side walls of the shaft adjacent the two plates 16 are cut away as shown more particularly in Fig. 4, and attached to each plate 16 at the unslotted end is a filler piece 19 of segmental cross section, with its outer face substantially flush with the periphery of the tubular sleeve 4. The outer faces of the filler pieces fit within the ring or collar 18 and are fixedly secured thereto by suitable pins 20 as indicated in Fig. 4, the arrangement being such that the plates 16, the filler pieces 19 and the ring 18 form in effect a solid rigid structure as though formed of a single piece.

The shaft 4 is provided with a shoulder 22 for limiting the extent of movement of the ring 18, and the opposite sides of the shaft are cut away to a point somewhat beyond the shoulder and also beyond the position of the rollers 25, and supported by the shaft 4 at the edges of the slots overlying the edges of the plates 16 are rollers 24 spaced apart to form guides for the edges of the plates 16, the axes of the rollers 24 being in the same plane as the axis of the rollers 25 when the tilting shaft 7 is in its position of alinement with the driving shaft. Beyond the rollers 24 the shaft 4 is sufficiently enlarged to permit the projection of the plate 16 into its bore without cutting away the walls of the tubular shaft.

The end of the tubular shaft projects into and is supported by a suitable ball bearing 5 carried by the crank case of the pump just beyond its joint with the casing 3 which supports the adjusting mechanism. Within the bearing 5 the end of the tubular shaft 4 is closed by a plate or web 23 which is preferably integral with the shaft 4, and is provided with a transverse slot equal to the width of the shaft 7 and of sufficient length to permit the pivotal movement of the shaft as effected by the cam plates 16.

With a multi-cylinder pump or motor having its cylinders radially arranged and its pistons actuated from a common crank pin, the resulting driving torque is applied in a line substantially at right angles to the crank arm. Hence in the construction described, the load is transmitted from the crank pin on the end of the shaft 7 to the tubular shaft at the end of the tubular shaft within the bearing, where it is of maximum strength and supported to prevent strain on the adjusting mechanism. Also the crank pin instead of being in effect overhung all the way back to the adjusting rollers, is overhung merely through the length of the squared projecting portion beyond the web 23.

The collar 18 may be adjusted in any suitable manner and as a typical mechanism for this purpose I have shown a cross shaft 26 set in the wall of the casing 3 provided with rock arms 27 having a pin and slot connection with the ring $19^a$ supported in the groove formed in the periphery of the collar 18. The shaft 26 may be oscillated by a suitable lever, not shown, attached to the projecting end of the shaft.

The discharge of fluid from the several cylinders is controlled by means of a rotary valve 28 driven directly from the end of the crank pin 8 through a bifurcated projection 29 which embraces the squared end of the shaft.

The specific construction of the valve 28 forms no part of my present invention, but will be briefly described in order that the operation of the device as a whole may be readily understood.

The valve rotates in a valve chamber 30 whose center has its axis in line with the axis of rotation of the driving shaft. Each of the cylinders 10 is connected at its top to a valve chamber through suitable ports 31 located at about the middle of the length of the valve chamber, the several ports being separated from each other by intermediate spaces having a working engagement with the periphery of the valve 28 so that the several ports 31 are in communication with each other only when connected through the ports of the valve.

Formed on the opposite faces of the valve 28 by cutting away the metal of the valve are the high pressure and low pressure ports 32, 33, respectively, which receive the fluid successively from the several cylinders. The port 32 is connected through a longitudinal passage as shown in dotted lines in Fig. 1 with one delivery port 34 of the valve and the other delivery port 35 being connected by a similar longitudinal passage with the opposite port 33.

The wall of the valve chamber 30 surrounding the ports 34 and 35 is counterbored as shown, and each counterbore connects with a suitable fluid passage indicated at 36 and 37 respectively, leading to the opposite sides of the motor which forms with the pump the hydraulic variable speed gear, the motor and the pump and the passages 36 and 37 forming a closed fluid circuit through which the fluid under pressure from the pump is continuously circulated.

The circumferential width of the cylinder ports 31 and the valve ports 32 and 33 is such that each cylinder is maintained in communication with each port through 180 degrees rotation of the valve, and then immediately placed in communication with the opposite valve port, Fig. 4 showing the position of the parts with the piston of the top cylinder at its extreme outer position when the connection of the cylinder is changed from pressure to suction, according to the position of adjustment of the pump shaft.

The inclined slots in the plates 16 are of sufficient inclination and depth to give the desired variation in stroke to the crank pin formed by the end of the shaft 7. In the construction shown the cam slots are shaped to give a range of adjustment from a maximum stroke on one side of the zero, or no-stroke, position in which the tilting shaft is in alinement with the driving shaft, to a maximum in the opposite direction of adjustment, the edges of the slots 17$^a$ on each side of the zero position being preferably offset slightly to thereby give a slight period of dwell or lost motion at the zero position. That is, the edges of the slots 17$^a$ are for a short part of their length parallel with the axis of rotation, the object being to provide a zero position which can be obtained without the nice and exact adjustment necessary to bring the sliding sleeve 19 to a single exact point. In some forms of gears, particularly those intended for turret control where it is desirable to frequently and rapidly reverse the direction of flow of the fluid, the slots 17 will have their edges continuous so that there will be no lost motion at the zero position. For ordinary use where the part to be driven by the hydraulic gear is to be left frequently at rest, the construction shown is advantageous, as a motor may be stopped by rough adjustment of the lever to its stop position, and the lever need not be locked to maintain it in this position.

It will of course be understood that other changes may be made in the mechanical construction of the parts of the device, and it is to be understood that my invention is not limited in any sense to the details herein shown and described, except so far as cited in the appended claims.

I claim:

1. A variable stroke crank mechanism comprising a shaft having a movable portion adjustable in a plane radial to the axis of rotation, a member having a cam surface engaging said movable portion for adjusting such movable portion, and maintaining it in adjusted position.

2. In a variable capacity pump or motor, the combination of a cylinder, a piston mounted for reciprocation therein, a variable stroke crank mechanism for operating said piston comprising a shaft having a pivotal attachment forming a longitudinal extension of said shaft, means for adjusting the free end of said shaft toward and away from the axis of rotation, connections between the free end of said shaft and said piston, means for relatively rotating said cylinder and said shaft, and a valve mechanism for said cylinder connected to the free end of said shaft extension adjacent said piston connections.

3. In a variable capacity pump or motor, the combination of a stationary cylinder, a piston mounted for reciprocation therein, a shaft for operating said piston comprising a portion mounted for rotation in fixed bearings, a second portion pivotally connected to the first portion to form a longitudinal extension thereof, means for pivotally adjusting said extension to shift its free end toward and away from the axis of rotation on opposite sides thereof, connections between the extension and the pump piston to effect the operation of the latter, and a valve mechanism for said cylinder comprising a rotatable part connected to the free end of said extension adjacent said piston connections for rotation in unison therewith whereby the adjustment of said pivotal extension from one side to the other of the axis of rotation will reverse the flow of fluid through said valve.

4. In a variable capacity pump or motor the combination of a stationary cylinder, a piston mounted for reciprocation therein, a shaft for operating said piston comprising a portion mounted for rotation in fixed bearings, a second portion pivotally connected to the first portion to form a longitudinal extension thereof, means for pivotally adjusting said extension to shift its free end toward and away from the axis of rotation on opposite sides thereof, connections between the extension and the pump piston to effect the operation of the latter, and a valve chamber for said cylinder forming a longitudinal extension concentric with the axis of rotation, a rotary valve therein, a driving connection between said valve and the free end of said shaft extension adjacent said piston connections for rotating said valve in unison with said shaft, said connection permitting the radial movement of the shaft extension relatively to the valve.

5. In a variable capacity pump or motor, the combination of a plurality of radial cylinders, pistons therein, an operating shaft, a common valve chamber for all said cylinders concentric with the axis of rotation of said shaft, a rotary valve mounted in said valve chamber, the shaft having a pivotally attached portion on the longitudinal extension thereof, operating connections between the free end of said shaft and said pistons, means for adjusting said shaft extension to vary the distance of its free end from the axis of rotation, operating connections between said pistons and said shaft extensions, and between the free end of said shaft extension adjacent said piston connections and said valve, said shaft and said cylinders being adapted for relative rotation.

6. In a variable stroke crank, the combination of a shaft, said shaft having a tubular extension, a shaft portion pivotally attached to said first mentioned shaft within said tubular extension with its end projecting beyond said extension, and means mounted on said tubular extension for adjusting said pivotally mounted shaft portion to shift its free end toward and from the axis of rotation, whereby said free end is adapted to form a crank pin of variable stroke.

7. A variable stroke crank mechanism comprising a rotatably mounted shaft, a part pivoted to said shaft for movement in a plane radial to the axis of rotation of said shaft, and means for adjusting said pivoted part comprising a cam member supported by said shaft for axial movement relatively thereto, said cam member having its cam surface operatively engaging the said pivoted part.

8. In a variable stroke crank mechanism the combination of a tubular shaft mounted for rotation in fixed bearings, a shaft mounted within said tubular shaft and pivoted thereto for movement in a plane radial to the axis of rotation, the end of said pivoted shaft projecting beyond said tubular shaft to form a crank pin, and adjusting mechanism mounted within said tubular shaft and operatively connected to said pivoted shaft for adjusting said pivoted shaft to various angular positions relative to the axis of rotation.

9. In a variable stroke crank mechanism the combination of a tubular shaft mounted for rotation in fixed bearings, a shaft mounted within said tubular shaft and pivoted thereto for movement in a plane radial to the axis of rotation, the end of said pivoted shaft projecting beyond said tubular shaft to form a crank pin, adjusting mechanism mounted within said tubular shaft and operatively connected to said pivoted shaft for adjusting said pivoted shaft to various angular positions relative to the axis of rotation, said means comprising a cam member mounted for axial movement in said tubular shaft and having a cam face inclined to the axis of rotation, and a projection on said pivoted shaft engaging said cam face.

10. In a variable stroke crank mechanism the combination of a tubular shaft mounted for rotation in fixed bearings, a shaft mounted within said tubular shaft and pivoted thereto for movement in a plane radial to the axis of rotation, the end of said pivoted shaft projecting beyond said tubular shaft to form a crank pin, and adjusting mechanism mounted within said tubular shaft and operatively connected to said pivoted shaft for adjusting said pivoted shaft to various angular positions relative to the axis of rotation, said mechanism comprising a pair of cam plates mounted for axial movement in said tubular shaft with their faces parallel to the plane of movement of said pivoted shaft, inclined slots in said plates, and pins projecting from the adjacent faces of said pivoted shaft into said slots.

11. In a variable stroke crank mechanism the combination of a tubular shaft mounted for rotation in fixed bearings, a shaft mounted within said tubular shaft and pivoted thereto for movement in a plane radial to the axis of rotation, the end of said pivoted shaft projecting beyond said tubular shaft to form a crank pin, adjusting mechanism mounted within said tubular shaft and operatively connected to said pivoted shaft for adjusting said pivoted shaft to various angular positions relative to the axis of rotation, said mechanism comprising a pair of cam plates mounted for axial movement in said tubular shaft with their faces parallel to the plane of movement of said pivoted shaft, inclined slots in said plates, and rollers mounted in the walls of said tubular shaft with their peripheries engaging the edges of said cam plates.

Signed at New York city in the county of New York and State of New York, this 31st day of August, 1916.

HUGO CENTERVALL.